United States Patent
Zhadanov

[11] Patent Number: 6,164,326
[45] Date of Patent: Dec. 26, 2000

[54] DEVICE FOR INTRODUCING ENCAPSULATED PRODUCTS INTO WATER

[76] Inventor: Eli Zhadanov, 2942 W. 5th St., Brooklyn, N.Y. 11214

[21] Appl. No.: 09/262,635

[22] Filed: Mar. 4, 1999

Related U.S. Application Data

[63] Continuation-in-part of application No. 08/971,752, Nov. 17, 1997.
[51] Int. Cl.[7] .................................................. F16K 55/00
[52] U.S. Cl. ........................ 137/564.5; 137/268; 222/190
[58] Field of Search ........................ 222/190; 137/564.5, 137/268

[56] References Cited

U.S. PATENT DOCUMENTS

| | | |
|---|---|---|
| 1,006,016 | 10/1911 | Spayd et al. . |
| 3,864,090 | 2/1975 | Richards .................................. 422/269 |
| 4,793,476 | 12/1988 | Schrupp .................................... 206/222 |
| 5,384,102 | 1/1995 | Ferguson et al. ......................... 422/264 |
| 5,913,327 | 6/1999 | Zhadanov et al. .................... 137/205.5 |

*Primary Examiner*—A. Michael Chambers
*Attorney, Agent, or Firm*—I. Zborovsky

[57] ABSTRACT

A device for introducing encapsulated products into water has a container adopted to accommodate a product, and a piercing element arranged in the container so that when a capsule with a product is pushed into the container its wall is pierced by the piercing element and a product flows from the capsule into an interior of the container.

12 Claims, 1 Drawing Sheet

DEVICE FOR INTRODUCING ENCAPSULATED PRODUCTS INTO WATER

CROSS-REFERENCE TO A RELATED APPLICATION

This application is a continuation-in-part application Ser. No. 08/971,752, filed Nov. 17, 1997

BACKGROUND OF THE INVENTION

The present invention relates to a device for introducing encapsulated products into water.

It is well known that during taking shower or bath people use soaps, shampoos, conditioners, aromatic substances, perfumery substances, etc. These products are supplied in bottles; however, recently they are also supplied in gel capsules, such as for example bath beads, etc. A user has to rupture the wall of the capsule and to empty its content into water. Some devices are also known which assist in rupturing of the capsules for discharging their content.

SUMMARY OF THE INVENTION

Accordingly, it is an object of the present invention to provide a device for introducing encapsulated products into water, which is a further improvement of the existing devices.

In keeping with these objects and with others which will become apparent hereinafter, one feature of present invention resides, briefly stated, in a device for introducing encapsulated products into water, which has a container for accommodating a product supplied from a capsule, and piercing means provided in said container and formed so that when a user introduces the capsule with the product into the container, the capsule wall is punctured and the capsule content empties into the container.

In accordance with one advantageous feature of present invention, the piercing means can include one or several projections which are formed of one piece with the container, in particular with its neck, or its wall, or its bottom. Also, it is possible to have piercing means formed as a separate element associated with the container.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
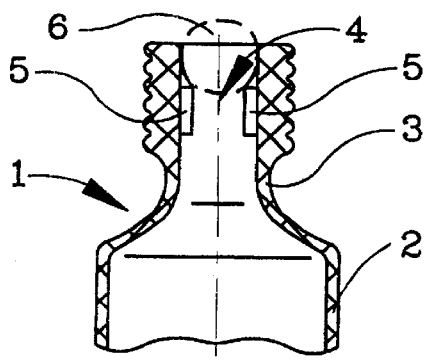
FIGS. 1 and 2 are a side view and a plan view of a device in accordance with a first embodiment of the present invention.
Figure 2:
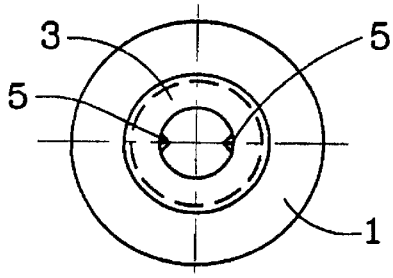

A device for introducing substances into water as shown in FIGS. 1 and 2 include a container which is identified as a whole with reference numeral 1. The container 1 is formed as a bottle or the like. It has a wall 2 and a neck 3. The device in accordance with the present invention further has piercing means which are identified as a whole with reference numeral 4. The piercing means can include at least one sharpened or pointed projection 5, or several such projections. In the embodiment of FIGS. 1 and 2, the projections 5 are arranged on an inner surface of the neck 3 of the container 1. Also, they are made of one piece with the neck 3 during the manufacture of the container 1. The projections 5 are spaced from one another in a circumferential direction of the neck 3.

When a capsule 6 which contains a product for showering, bathing and the like is forcedly introduced into the container 1 through the neck 3, the wall of the capsule 6 is pierced by the projections 5, and the product from the capsule 6 flows into the interior of the container 1. The container 1 filled with the product can be used for pouring its product into a bath, on a user taking shower, or into a showering equipment, for example into a shower water supplying element.

Figure 3:
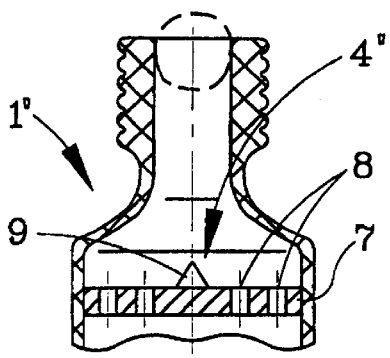
FIGS. 3 and 4 are views showing a side view and a section of a device in accordance with another embodiment of the present invention.
Figure 4:
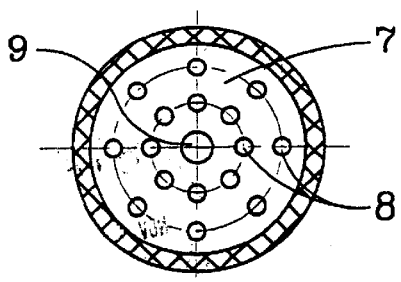

The device in accordance with the embodiment shown in FIGS. 3 and 4 also has a container 1', and means 4' for piercing the capsules. However, piercing means are formed differently. The device is provided with a separate element 7 which can be formed as a disc with a plurality of openings 8. The disc 7 can be snuggly fitted inside the container 1' so as to be firmly held by friction between the outer circumferential surface of the disc and the inner circumferential surface of the wall of the container. A sharpened or pointed projection 9 is provided in the center of the disc 7. When the capsules 6 are passed through the neck of the container 1' downwardly, their walls are pierced by the projection 9 and their content is emptied into the container 1' and flows through the openings 8 downwardly.

Figure 5:
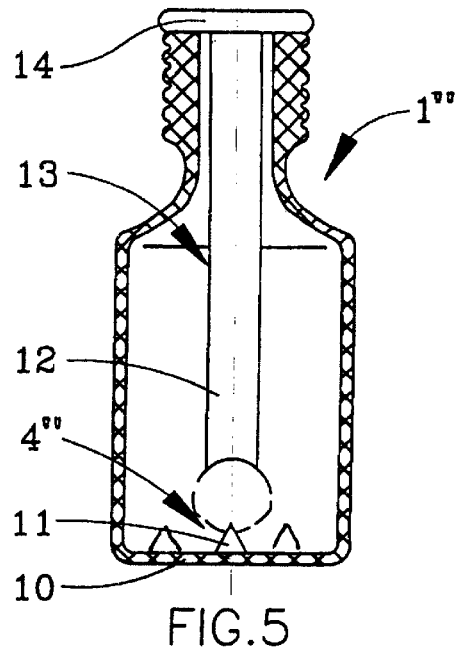
FIG. 5 is a side view of the inventive device in accordance with a further embodiment of the present invention.

While in the embodiment of FIGS. 1, 2 the piercing means 4 are arranged in the region of the neck of the container and in the embodiment of FIGS. 3, 4 piercing means are supported by the peripheral wall of the container, the device in accordance with the embodiment of FIG. 5 is somewhat different. The device shown in FIG. 5 has a container 1" with a side wall 2, a neck 3, and a bottom 10. The piercing means 4" include at least one sharpened or pointed projection 11 which is formed on the bottom 10 on the container 1". The capsule 6 can be introduced into the container 1" through the neck 3 and then pressed against the projection 11 by hand or by an additional pressing element 12. In the shown embodiment the element 12 is a part of a plug 13 having a lid 14. When the pressure is applied onto the capsule 6 from above toward the projection 11, the capsule wall is pierced through and the capsule content is empties into the interior of the container 1".

Figure 6:
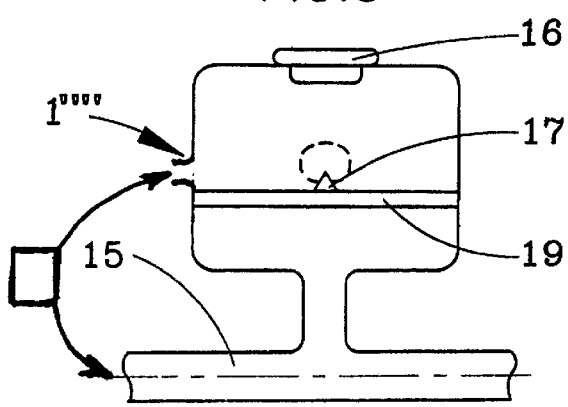
FIGS. 6 and 7 are views showing the inventive device in accordance with still another embodiment of the invention.
Figure 7:
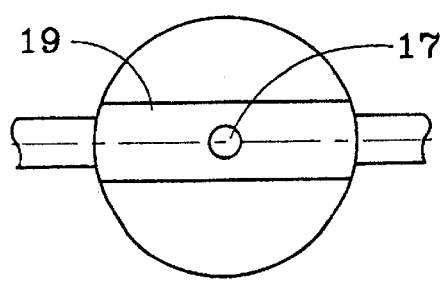

In the embodiment shown in FIGS. 6, 7, the device has a container 1"" which is arranged on a water supplying conduit 15 and normally closed by a lid 16. The piercing means 4"" are formed here by a sharpened or pointed projection 17 which is arranged on a transverse strip 19. In use water is supplied through the conduit 15, the lid 16 is removed and the capsules are introduced into the container 1"" and pressed against the projection 17 so that the content of the capsules flows into the container, in which it is mixed with water of an additional water stream supplied into the container, and thereafter flows into the conduit 15.

In the actual system water can be supplied from a common source and then branched into a main water stream which flows through the conduit 15 and an additional water stream which is supplied into the container 1"", is enriched with the capsule content and thereafter flows into the conduit.

It will be understood that each of the elements described above, or two or more together, may also find a useful application in other types of constructions differing from the types described above.

While the invention has been illustrated and described as embodied in device for introducing encapsulated product into water, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

What is claimed is:

1. A device for introducing encapsulated products into water, comprising a container adopted to accommodate a product; and piercing means arranged in said container so that when a capsule with a product is pushed into said container its wall is pierced by said piercing means and a product flows from the capsule into an interior of said container, said piercing means including a supporting element mounted on a peripheral wall of said container, said piercing means including a supporting element mounted on a peripheral wall of said container, said container having a neck portion, a peripheral wall and a bottom, said piercing means being arranged on one of said neck portion, said peripheral wall, and said bottom.

2. A device as defined in claim 1, wherein said piercing means are formed of one piece with said container.

3. A device as defined in claim 1, wherein said piercing means include at least one sharp projection.

4. A device as defined in claim 1, wherein said piercing means include a plurality of sharp projections.

5. A device as defined in claim 1, wherein said container has an inlet for admitting water into said container to be mixed with the product released from the capsule.

6. A device as defined in claim 1, wherein said piercing means include at least one elongated sharp projection.

7. A device as defined in claim 1, and further comprising a water source which supplies water, and means for branching the water so that one main water stream is supplied into said water supplying line and an additional water stream is supplied into said container.

8. A device for introducing encapsulated products into water, comprising a container adopted to accommodate a product; and piercing means arranged in said container so that when a capsule with a product is pushed into said container its wall is pierced by said piercing means and a product flows from the capsule into an interior of said container, said piercing means including a supporting element mounted on a peripheral wall of said container, said piercing means including a supporting element mounted on a peripheral wall of said container, said piercing means including a supporting element mounted on a peripheral wall of said container, and a sharp projection supported by said supporting element.

9. A device for introducing encapsulated products into water, comprising a container adopted to accommodate a product; and piercing means arranged in said container so that when a capsule with a product is pushed into said container its wall is pierced by said piercing means and a product flows from the capsule into an interior of said container, said piercing means including a supporting element mounted on a peripheral wall of said container, said piercing means including a supporting element mounted on a peripheral wall of said container; and further comprising means forming a water supplying line, said container being mounted on said water supplying line, said piercing means being associated with said water supplying line.

10. A device as defined in claim 9, wherein said water supplying line has an opening communicating with an interior of said container, said piercing means being mounted on said water supplying line.

11. A device as defined in claim 9, wherein said piercing means include a supporting element connected with said water supplying line and a sharp projection supported by said supporting element.

12. A device as defined in claim 11, wherein said water supplying line has an opening which communicates the interior of said container with the interior of said water supplying line, said supporting element being formed as a transverse strip extending across said opening, said sharp projection being located substantially in the center of said strip.

* * * * *